US008088530B2

(12) United States Patent
Chowdhury et al.

(10) Patent No.: US 8,088,530 B2
(45) Date of Patent: Jan. 3, 2012

(54) METHOD OF OPERATING A FUEL CELL SYSTEM IN STANDBY/REGENERATIVE MODE

(75) Inventors: Akbar Chowdhury, Pittsford, NY (US); John P. Salvador, Penfield, NY (US); Abdullah B. Alp, West Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 528 days.

(21) Appl. No.: 12/336,193

(22) Filed: Dec. 16, 2008

(65) Prior Publication Data

US 2010/0151288 A1 Jun. 17, 2010

(51) Int. Cl.
*H01M 8/04* (2006.01)

(52) U.S. Cl. ......................... 429/444; 429/443; 429/446

(58) Field of Classification Search .................. 429/443, 429/444, 446

See application file for complete search history.

(56) References Cited

U.S. PATENT DOCUMENTS

2003/0022042 A1 * 1/2003 Wells et al. .................... 429/23

* cited by examiner

*Primary Examiner* — Gregg Cantelmo
*Assistant Examiner* — Eugenia Wang
(74) *Attorney, Agent, or Firm* — John A. Miller; Miller IP Group, PLC

(57) ABSTRACT

A system and method for putting a fuel cell system in a stand-by during a system idle condition to improve system fuel efficiency. The method can include diverting the cathode airflow around the stack, reducing an airflow output from a cathode compressor to a minimum allowable set-point, opening the stack contactors to disconnect the stack from the high voltage bus and electrically isolate the stack from the rest of the system, engaging an independent load to the stack, such as end cell heaters in the stack, to suppress stack voltage, maintaining a positive pressure in the anode side of the fuel cell stack and periodically bleeding the anode into the exhaust stream. When a system power request is made removing the idle condition, the system returns to normal operation by directing the airflow back to the cathode and opening the stack contactors when an open circuit voltage is attained.

14 Claims, 2 Drawing Sheets

METHOD OF OPERATING A FUEL CELL SYSTEM IN STANDBY/REGENERATIVE MODE

BACKGROUND OF THE INVENTION

1. Field of the Invention

This invention relates generally to a system and method for improving the fuel efficiency of a fuel cell system and, more particularly, to a system and method for improving the fuel efficiency of a fuel cell system by putting the fuel cell system in a stand-by mode during system idle that includes by-passing compressor air around a fuel cell stack and providing an independent load on the stack to reduce its output voltage.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

In one example, when a fuel cell system is in an idle mode, such as a fuel cell system vehicle being stopped at a stop light, where the fuel cell stack is not generating power to operate system devices, cathode air and hydrogen gas are still being provided to the fuel cell stack, and the stack is generating output power. Providing hydrogen gas to the fuel cell stack when it is in the idle mode is generally wasteful because operating the stack under this condition is not producing very much useful work. Thus, it is generally desirable to reduce stack output power and current draw during these idle conditions to improve system fuel efficiency.

SUMMARY OF THE INVENTION

In accordance with the teachings of the present invention, a system and method are disclosed for putting a fuel cell system in a stand-by or regenerative mode during a system idle condition to improve system fuel efficiency. The method can include diverting the cathode airflow around the stack, reducing an airflow output from a cathode compressor to a minimum allowable set-point, opening the stack primary contactors to disconnect the stack from the high voltage bus and electrically isolate the stack from the rest of the system, engaging an independent load to the stack, such as end cell heaters in the stack, to suppress stack voltage, maintaining a positive pressure in the anode side of the fuel cell stack and periodically bleeding the anode into the exhaust stream. When a system power request is made removing the idle condition, the system returns to normal operation by directing the compressor airflow back to the cathode and opening the stack contactors when an open circuit voltage or idle operating voltage is attained.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a process for putting a fuel cell system in a stand-by or regenerative mode during system idle to improve fuel efficiency is merely exemplary in nature, and is in no way intended to limit the invention or its applications or uses.

Figure 1:
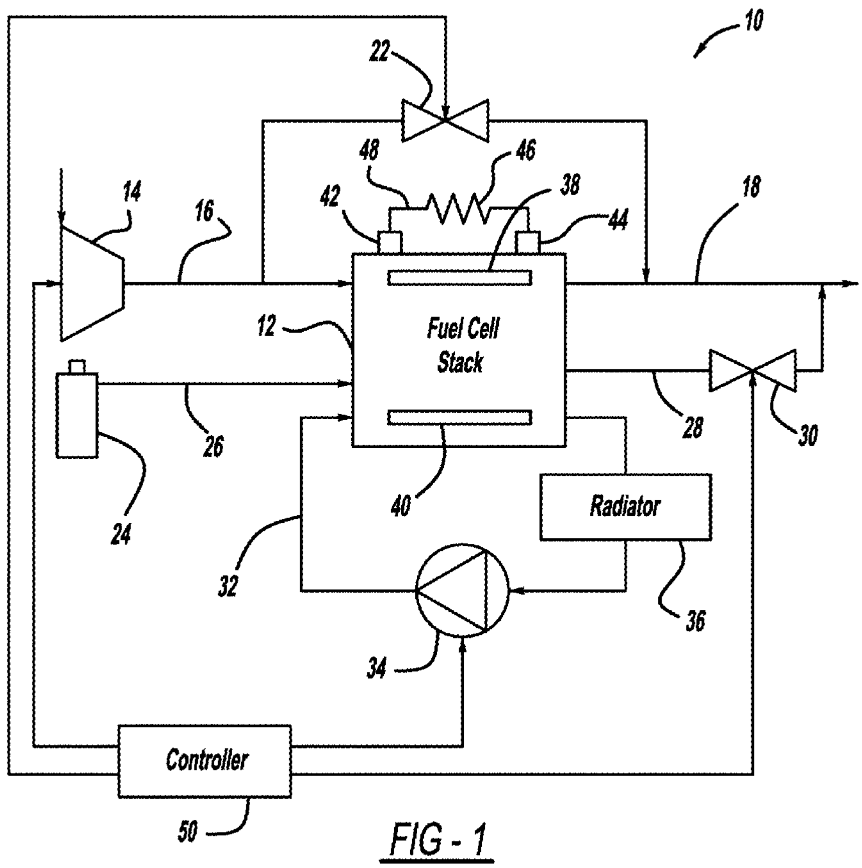
FIG. 1 is a schematic block diagram of a fuel cell system.

FIG. 1 is a schematic block diagram of a fuel cell system 10 including a fuel cell stack 12. The fuel cell system 10 includes a compressor 14 that provides cathode air to the cathode side of the stack 12 on a cathode input line 16. Cathode exhaust is output from the fuel cell stack 12 on cathode exhaust gas line 18. A by-pass line 20 is provided around the fuel cell stack 12 and a by-pass valve 22 can be opened to allow the air from the compressor 14 to by-pass the cathode side of the fuel cell stack 12. Hydrogen fuel is provided to the anode side of the fuel cell stack 12 from a hydrogen source 24 on an anode input line 26. Anode exhaust is output from the fuel cell stack 12 on line 28 during anode bleeds when a bleed valve 30 is opened to direct the anode exhaust gas to the output line 18.

The fuel cell stack 12 is cooled by a cooling fluid flowing through a coolant loop 32. The cooling fluid is pumped through the stack 12 and the coolant loop 32 by a high temperature pump 34. A radiator 36 cools the cooling fluid when it exits the stack 12 so that it is able to provide stack cooling in a recirculation manner. The fuel cell stack 12 may include end cell heaters 38 and 40 that heat end cells in the stack 12, which typically operate at a cooler temperature than the rest of the cells in the fuel cell stack 12, as is well understood to those skilled in the art. Stack primary contactors 42 and 44 selectively electrically couple the fuel cell stack 12 to a high voltage bus 48 coupled to a system load 46. A system controller 50 controls the system 10, including the by-pass valve 22, the bleed valve 30, the high temperature pump 34 and the compressor 14.

When the fuel cell system 10 is in an idle mode, such as when a fuel cell vehicle is stopped at a stoplight, the compressor 14 can continue to use 100s to 1000s of Watts depending on the architecture. A proportional amount of hydrogen fuel from the hydrogen source 24 is provided to the anode side of the stack 12 to maintain the operation of the stack 12, as is well understood by those skilled in the art. The present invention proposes putting the fuel cell system 10 into a stand-by or regenerative mode during the idle mode so that the system 10 is using a minimal amount of hydrogen fuel as is necessary to keep the system running for efficiency purposes.

When the fuel cell system 10 goes into the stand-by mode, the by-pass valve 22 is opened so cathode air from the compressor 14 is diverted from the fuel cell stack 12 under low pressure to the cathode exhaust gas line 18. Thus, the compressor 14 does not have to force the air through the stack 12. Further, the compressor 14 is operated at its minimum set-point or speed. If regenerative braking is being used where electrical energy from engine braking is generated, a set-point signal could be sent to the compressor 14 to consume the desired amount of energy being regenerated.

The low power or stand-by mode could also include an operating methodology where, upon reaching the right conditions for entering the stand-by mode, the stack 12 would be isolated from the system 10 by opening the primary contactors 42 and 44 to disconnect the stack 12 from the bus 48 and the primary load 46. Also, an independent load separate from the bus 48 could be electrically connected to the stack 12 once the contactors 42 and 44 were opened, such as the end cell heaters 38 and 40. Once the stack 12 is disengaged from the high voltage bus 48, the compressor 14 could receive power from a supplemental energy source, such as a battery or an ultracapacitor (not shown), or from regenerative braking.

The anode side of the stack 12 could be supplied with hydrogen gas at a set-point above the pressure that the compressor 14 is inducing on the cathode side of the stack 12. During this time, the independent load on the stack side of the primary contactors 42 and 44 would be applied across the stack 12 so that the stack voltage collapses. The system 10 would bleed the anode side of the stack 12 periodically to remove any nitrogen that might accumulate on the anode side of the stack 12. Additionally, if appropriate, the system 10 could turn off the coolant pump 34 to further reduce the power draw on the system 10.

The system 10 would operate in the stand-by mode until such a time that the conditions exist for it to leave the low power or stand-by mode and resume normal operation. To exit the stand-by mode, the controller 50 would simply close the by-pass valve 22 to divert air from the compressor 14 into the stack 12 instead of around it. At this time, the stack voltage returns to an open circuit voltage, and the primary contactors 42 and 44 isolating the stack 12 from the bus 48 could be closed. Therefore, the amount of time that it would take to return to normal operation would be a simple function of how quickly the air could be sent back to the stack 12. Once the stack 12 has returned to normal operation, all of the functionality will return to normal. The amount of fuel or energy that is spent during this low power or stand-by mode is much less than if the stack 12 were left to operate at idle, and should therefore contribute significantly to operating efficiency.

Figure 2:
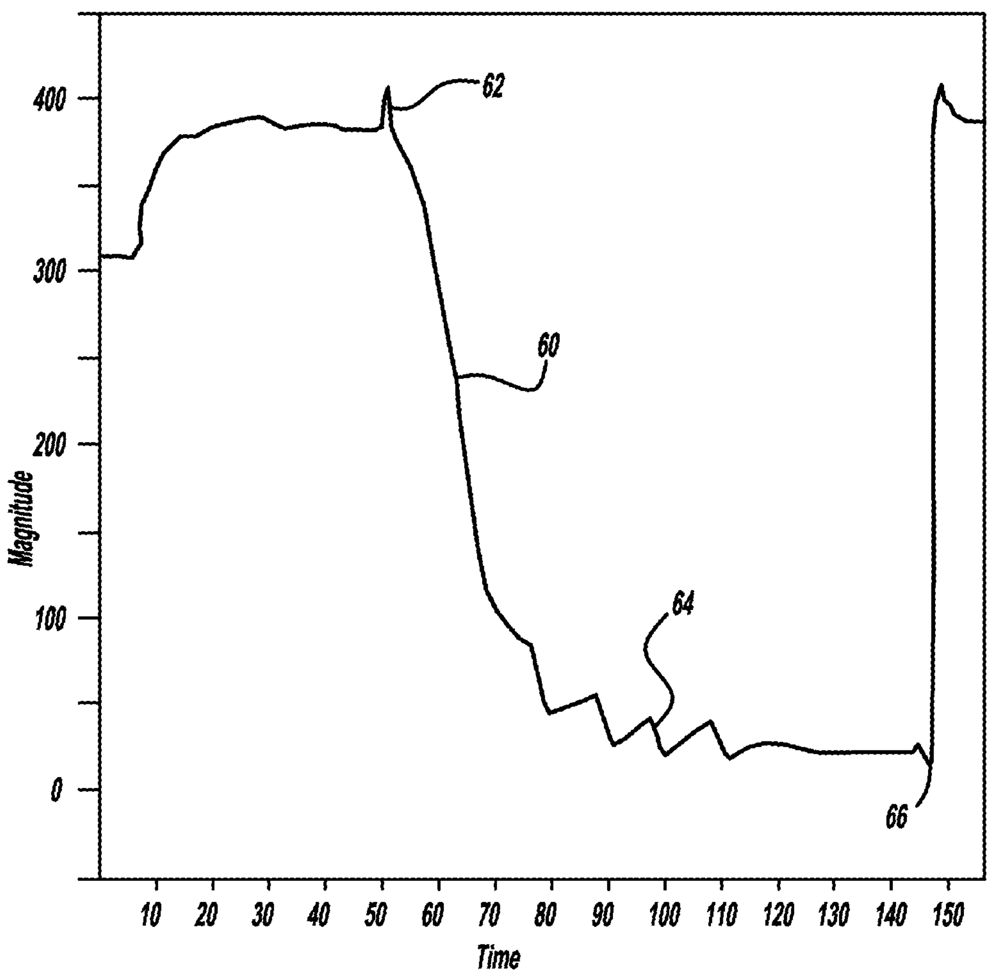
FIG. 2 is a graph with time on the horizontal axis and magnitude on the vertical axis showing stack output power when the fuel cell system is in a stand-by or regenerative mode.

FIG. 2 is a graph with time on the horizontal axis and magnitude on the vertical axis showing some of the states that occur when the system control goes from the idle mode to the stand-by mode. Graph line 60 is stack voltage output. The units on the horizontal axis and the vertical axis are merely representative for perspective and are not intended to be specific for system operation. At point 62, the system 10 has been in the idle mode for some period of time, such as forty seconds, and is commanded to go into the stand-by mode. The end cell heaters 38 and 40, or some other load, are engaged so that the stack voltage is suppressed to reduce corrosion so that the stack voltage decreases. Ripples 64 in the line 60 show where periodic anode bleed events have occurred consuming any oxygen that may have entered the cathode side of the fuel cell stack 12. Point 66 shows where the system 10 returns to the normal operating mode.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for putting a fuel cell system in a stand-by mode, said method comprising:
- recognizing that the system has been in an idle mode for a predetermined period of time;
- diverting cathode air from a compressor around a fuel cell stack by opening a stack by-pass valve;
- providing hydrogen flow to the fuel cell stack at a flow rate that maintains a higher anode positive pressure over the cathode side of the fuel cell stack;
- disconnecting the fuel cell stack from a high voltage bus by opening primary stack contactors; and
- electrically coupling the fuel cell stack to an independent load to suppress stack voltage.

2. The method according to claim 1 further comprising providing periodic anode bleeds by opening an anode exhaust gas bleed valve during the stand-by mode to remove nitrogen from the anode side of the fuel cell stack.

3. The method according to claim 1 wherein the independent load is end cell heaters within the fuel cell stack.

4. The method according to claim 1 further comprising turning off a high temperature pump that pumps a cooling fluid to the fuel cell stack.

5. The method according to claim 1 further comprising operating the compressor at a predetermined minimum speed.

6. The method according to claim 1 further comprising ending the stand-by mode and returning to a normal system operation by closing the by-pass valve to allow cathode air to be sent to the fuel cell stack and opening the primary contactors when the stack voltage returns to an open circuit voltage.

7. The method according to claim 1 wherein the predetermined period of time is about forty seconds.

8. A method for putting a fuel cell system in a stand-by mode, said method comprising:

recognizing that the system has been in an idle mode for a predetermined period of time;

diverting cathode air from a compressor around a fuel cell stack by opening a stack by-pass valve;

operating the compressor at a predetermined minimum speed;

disconnecting the fuel cell stack from a high voltage bus by opening primary stack contactors; and electrically coupling the fuel cell stack to an independent load to suppress stack voltage.

9. The method according to claim 8 further comprising providing periodic anode bleeds by opening an anode exhaust gas bleed valve during the stand-by mode to remove nitrogen from the anode side of the fuel cell stack.

10. The method according to claim 9 providing hydrogen flow to the fuel cell stack at a flow rate that maintains a higher anode positive pressure over the cathode side of the fuel cell stack.

11. The method according to claim 8 wherein the independent load is end cell heaters within the fuel cell stack.

12. The method according to claim 8 further comprising turning off a high temperature pump that pumps a cooling fluid to the fuel cell stack.

13. The method according to claim 8 further comprising ending the stand-by mode and returning to a normal system operation by closing the by-pass valve to allow cathode air to be sent to the fuel cell stack and opening the primary contactors when the stack voltage returns to an open circuit voltage.

14. The method according to claim 8 wherein the predetermined period of time is about forty seconds.

* * * * *